United States Patent
Yin et al.

(10) Patent No.: US 8,471,478 B2
(45) Date of Patent: Jun. 25, 2013

(54) LIGHT CONTROL SIGNAL GENERATING CIRCUIT

(75) Inventors: Ji-Xiang Yin, Shenzhen (CN); Ren-Wen Huang, Shenzhen (CN); Jun-Wei Zhang, Shenzhen (CN); Jun Zhang, Shenzhen (CN); Tsung-Jen Chuang, Tu-Cheng (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 13/095,927

(22) Filed: Apr. 28, 2011

(65) Prior Publication Data
US 2012/0176043 A1     Jul. 12, 2012

(30) Foreign Application Priority Data
Jan. 12, 2011     (CN) .......................... 2011 1 0005523

(51) Int. Cl.
*H05B 37/02*     (2006.01)
(52) U.S. Cl.
USPC ............................ 315/158; 315/307; 315/291
(58) Field of Classification Search
USPC .......................... 315/149, 158, 291, 307–309
See application file for complete search history.

(56) References Cited

U.S. PATENT DOCUMENTS

| | | | |
|---|---|---|---|
| 7,554,073 B2* | 6/2009 | Lum et al. ................ | 250/214 AL |
| 7,960,699 B2* | 6/2011 | Chang et al. ................ | 250/338.4 |
| 8,378,587 B2* | 2/2013 | Huguenin et al. ............. | 315/291 |
| 2010/0060562 A1* | 3/2010 | Hadwen et al. ................ | 345/102 |
| 2011/0140613 A1* | 6/2011 | Raynor ......................... | 315/158 |
| 2012/0091321 A1* | 4/2012 | Tanaka et al. ............... | 250/208.2 |
| 2012/0133287 A1* | 5/2012 | Steiner et al. .................. | 315/158 |
| 2012/0293078 A1* | 11/2012 | Logiudice et al. ............. | 315/153 |

* cited by examiner

*Primary Examiner* — Don Le
(74) *Attorney, Agent, or Firm* — Altis Law Group, Inc.

(57) ABSTRACT

A light control signal generating circuit includes a photosensitive element, two transistors, and four resistances. A first resistance and the photosensitive element are connected in series between a power voltage terminal and a ground terminal. A base electrode of a first transistor is connected to a node between the first resistance and the photosensitive element, a collecting electrode is connected to the power voltage terminal through a second resistance, and an emitting electrode is connected to the ground terminal through a third resistance. A base electrode of a second transistor is connected to a node between the second resistance and the first transistor, a collecting electrode is connected to the power voltage terminal through a fourth resistance, and an emitting electrode is connected to the ground terminal through the third resistance. An output terminal is formed from a node between the fourth resistance and the second transistor.

15 Claims, 2 Drawing Sheets

LIGHT CONTROL SIGNAL GENERATING CIRCUIT

BACKGROUND

1. Technical Field

The disclosure relates to a circuit and, more particularly, to a light control signal generating circuit.

2. Description of Related Art

A light control circuit often includes a special integrated chip, such as a 555 chip. However, the special integrated chip is very expensive and the circuit structure is complex.

Therefore, what is needed is a light control signal generating circuit to overcome the described shortcoming.

DETAILED DESCRIPTION

Figure 1:
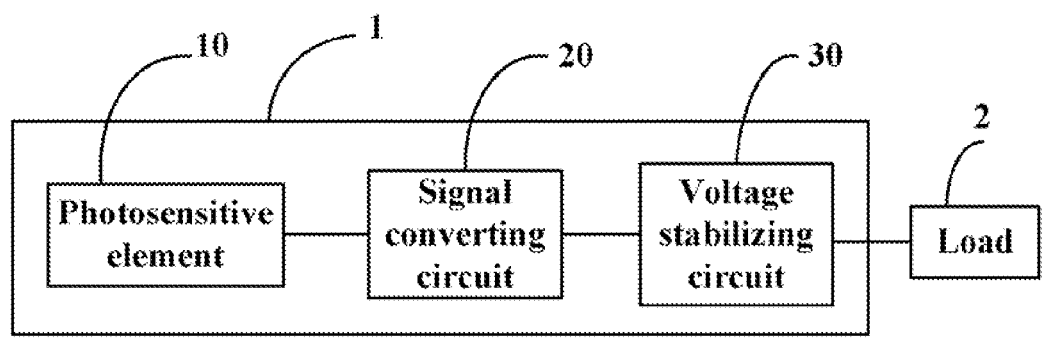
FIG. 1 is a block diagram of a light control signal generating circuit in accordance with an exemplary embodiment.

FIG. 1 is a block diagram of a light control signal generating circuit in accordance with an exemplary embodiment. The light control signal generating circuit (hereinafter "the circuit") 1 is utilized for outputting a stable level voltage according to received ambient light, such as a stable high or low level voltage. The circuit 1 includes a photosensitive element 10, a signal converting circuit 20, and a voltage stabilizing circuit 30. The photosensitive element 10 is configured for receiving ambient light. When a signal strength of the ambient light is greater than or equal to a preset value, the photosensitive element 10 is turned on. When the signal strength of the ambient light is less than the preset value, the photosensitive element 10 is turned off.

When the photosensitive element 10 is turned on, the signal converting circuit 20 outputs a low level voltage. When the photosensitive element 10 is turned off, the signal converting circuit 20 outputs a high level voltage. The voltage stabilizing circuit 30 is configured for stabilizing the high or low level voltage from the signal converting circuit 20. In another embodiment, the voltage stabilizing circuit 30 can be omitted.

The circuit 1 may be connected with a load 2 and controls the load 2. In one embodiment, the load 2 is an illumination device. When the circuit 1 outputs a high level voltage to the illumination device, the illumination device emits light. When the circuit 1 outputs a low level voltage to the illumination device, the illumination device turns off. Therefore, the circuit 1 senses the brightness of the ambient light and controls the illumination device to turn on or turn off according to the brightness of the ambient light.

Figure 2:
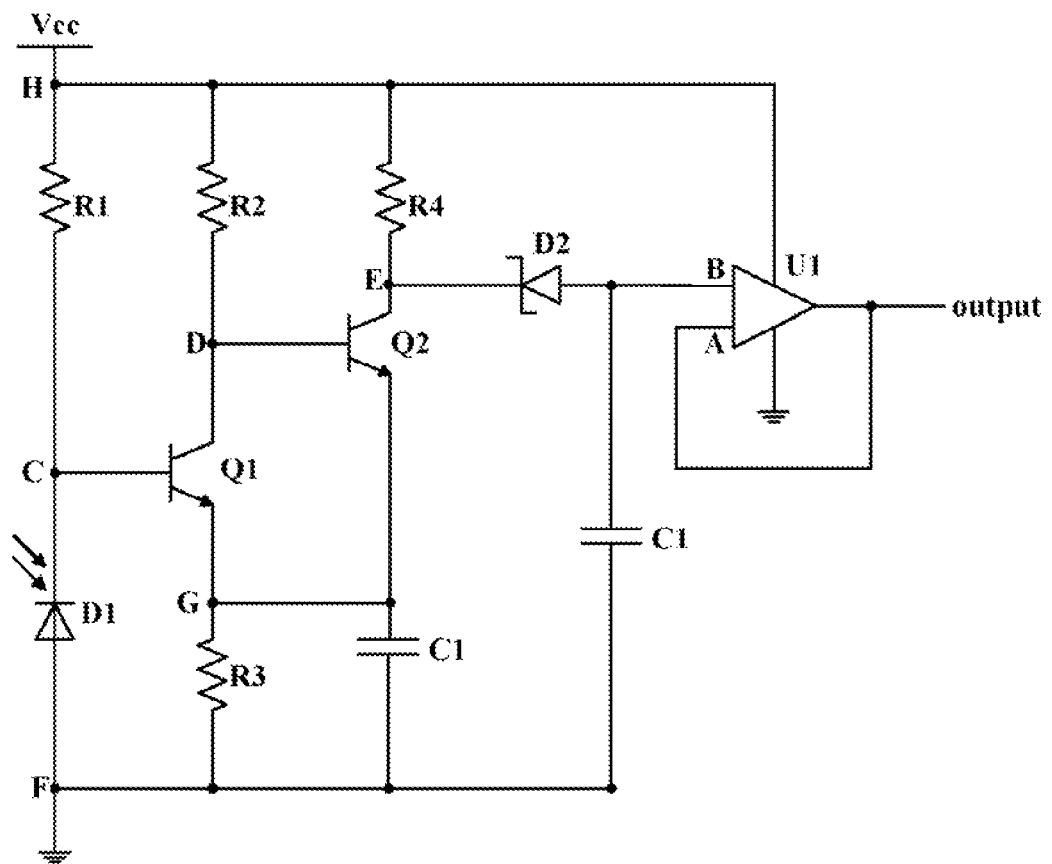
FIG. 2 is a circuit diagram of the circuit of FIG. 1.

As shown in FIG. 2, in the embodiment, the photosensitive element 10 is an LED light-sensitive diode D1, the signal converting circuit 20 includes two transistors Q1, Q2 and four resistances R1, R2, R3, R4, and the voltage stabilizing circuit 30 includes a voltage stabilizing diode D2 and a voltage follower U1. The two transistors Q1, Q2 are the NPN type. A power voltage terminal Vcc provides a potential H to the signal converting circuit 20. The power voltage terminal Vcc may be connected with the positive pole of a battery (not shown) to generate the potential H.

A first resistance R1 and the LED light-sensitive diode D1 are connected in series between the power voltage terminal Vcc and the ground terminal F. A base electrode of a first transistor Q1 is connected to a node C between the first resistance R1 and the LED light-sensitive diode D1. A collecting electrode of the first transistor Q1 is connected to the power voltage terminal Vcc through a second resistance R2. An emitting electrode of the first transistor Q1 is connected to the ground terminal F through a third resistance R3.

A base electrode of a second transistor Q2 is connected to a node D between the second resistance R2 and the first transistor Q1. A collecting electrode of the second transistor Q2 is connected to the power voltage terminal Vcc through a fourth resistance R4. An emitting electrode of the second transistor Q2 is connected to the ground terminal F through the third resistance R3. Therefore, the collecting electrode of the first transistor Q1 is connected to the base electrode of the second transistor Q2 and the emitting electrode of the first transistor Q1 is connected to the emitting electrode of the second transistor Q2. An output terminal of the signal converting circuit 20 is formed from a node E between the fourth resistance R4 and the second transistor Q2.

In the embodiment, the voltage stabilizing diode D2 includes an input terminal (not shown) and an output terminal (not shown) and the input terminal is connected to the output terminal E of the signal converting circuit 20. In the embodiment, the first resistance R1 is about 100K ohm, both the second and the fourth resistances R2, R4 are about 10K ohm, and the third resistance R3 is about 2K ohm.

The voltage follower U1 includes an input terminal in phrase B, an input terminal in reversed phrase A, and an output terminal. The output terminal of the voltage follower U1 is connected to the load 2. The input terminal in phrase B is connected to the output terminal of the voltage stabilizing diode D2 and the input terminal in reversed phrase A is directly connected to the output terminal of the voltage follower U1. Therefore, the output terminal of the voltage follower U1 follows the voltage of the output terminal of the voltage stabilizing diode D2 and the output terminal of the circuit 1 outputs the voltage of the input terminal in phrase B, that is, the input terminal in phrase B receives a high level voltage. The output terminal of the circuit 1 outputs the high level voltage, the input terminal in phrase B receives a low level voltage, and the output terminal of the circuit 1 outputs the low level voltage.

When the signal strength of the ambient light from the LED light-sensitive diode D1 is greater than or equal to the preset value, the LED light-sensitive diode D1 is turned on. The base electrode of the first transistor Q1 is connected to the ground terminal F through the LED light-sensitive diode D1 and regarded as a low level, the first transistor Q1 is turned off. The base electrode of the second transistor Q2 is connected to the power voltage terminal Vcc through the second resistance R2 and regarded as a high level, the second transistor Q2 is turned on. The input terminal of the voltage stabilizing diode D2 is connected to the ground terminal F through the second transistor Q2 and the third resistance R3, the voltage stabilizing diode D2 outputs a stable low level voltage, and the voltage follower U1 follows and outputs the stable low level voltage.

When the signal strength of the ambient light from the LED light-sensitive diode D1 is less than the preset value, the LED light-sensitive diode D1 is turned off. The base electrode of the first transistor Q1 is connected to the power voltage terminal Vcc through the first resistance R1 and regarded as a high level, the first transistor Q1 is turned on and generates a small potential difference. Because the collecting electrode of the first transistor Q1 is connected to the base electrode of the second transistor Q2 and the emitting electrode of the first transistor Q1 is connected to the emitting electrode of the second transistor Q2, a potential difference between the base electrode and the emitting electrode of the second transistor Q2 is equal to one of the first transistor Q1 and the second transistor Q2 is turned off. The power voltage terminal Vcc outputs a high level voltage through the fourth resistance R4 to the input terminal of the voltage stabilizing diode D2, the voltage stabilizing diode D2 outputs a stable high level voltage, and the voltage follower U1 follows and outputs the stable high level voltage.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A light control signal generating circuit comprising:
   a photosensitive element for receiving ambient light;
   two transistors; and
   four resistances;
   wherein a first resistance and the photosensitive element are connected in series between a power voltage terminal and a ground terminal, a base electrode of a first transistor is connected to a node between the first resistance and the photosensitive element, a collecting electrode of the first transistor is connected to the power voltage terminal through a second resistance, an emitting electrode of the first transistor is connected to the ground terminal through a third resistance, a base electrode of a second transistor is connected to a node between the second resistance and the first transistor, a collecting electrode of the second transistor is connected to the power voltage terminal through a fourth resistance, an emitting electrode of the second transistor is connected to the ground terminal through the third resistance, and an output terminal is formed from a node between the fourth resistance and the second transistor.

2. The light control signal generating circuit as recited in claim 1, further comprising a voltage stabilizing circuit, connected to the output terminal, for outputting a stable level voltage.

3. The light control signal generating circuit as recited in claim 2, wherein the voltage stabilizing circuit further comprises a voltage stabilizing diode and a voltage follower.

4. The light control signal generating circuit as recited in claim 1, wherein the photosensitive element is an LED light-sensitive diode.

5. The light control signal generating circuit as recited in claim 1, wherein a type of the two transistors is NPN.

6. The light control signal generating circuit as recited in claim 1, wherein the first resistance is about 100K ohm, both the second and the fourth resistances are about 10K ohm, and the third resistance is about 2K ohm.

7. The light control signal generating circuit as recited in claim 1, wherein when a signal strength of the ambient light is greater than or equal to a preset value, the photosensitive element is turned on, the base electrode of the first transistor is connected to the ground through the photosensitive element and regarded as a low level, the first transistor is turned off; the base electrode of the second transistor is connected to the power voltage terminal through the second resistance and regarded as a high level, the second transistor is turned on and outputs a low level voltage; and when the signal strength of the ambient light is less than the preset value, the photosensitive element is turned off, the base electrode of the first transistor is connected to the power voltage terminal through the first resistance and regarded as a high level, the first transistor is turned on and generates a small potential difference, the second transistor is turned off and the power voltage terminal outputs a high level voltage through the fourth resistance.

8. A light control signal generating circuit comprising:
   a photosensitive element for receiving ambient light; and
   a signal converting circuit, connected to the photosensitive element, for outputting a high or low level voltage;
   wherein when the photosensitive element is turned on, the signal converting circuit outputs a low level voltage, when the photosensitive element is turned off, the signal converting circuit outputs a high level voltage.

9. The light control signal generating circuit as recited in claim 8, wherein the signal converting circuit comprises two transistors and four resistances, a first resistance and the photosensitive element are connected in series between a power voltage terminal and a ground terminal, a base electrode of a first transistor is connected to a node between the first resistance and the photosensitive element, a collecting electrode of the first transistor is connected to the power voltage terminal through a second resistance, an emitting electrode of the first transistor is connected to the ground terminal through a third resistance, a base electrode of a second resistance is connected to a node between the second resistance and the first transistor, a collecting electrode of the second transistor is connected to the power voltage terminal through a fourth resistance, an emitting electrode of the second transistor is connected to the ground terminal through the third resistance, and an output terminal is formed from a node between the fourth resistance and the second transistor.

10. The light control signal generating circuit as recited in claim 8, further comprising a voltage stabilizing circuit, connected to the signal converting circuit, for outputting a stable level voltage.

11. The light control signal generating circuit as recited in claim 10, wherein the voltage stabilizing circuit further comprises a voltage stabilizing diode and a voltage follower.

12. The light control signal generating circuit as recited in claim 8, wherein the photosensitive element is an LED light-sensitive diode.

13. The light control signal generating circuit as recited in claim 9, wherein a type of the two transistors is NPN.

14. The light control signal generating circuit as recited in claim 9, wherein the first resistance is about 100K ohm, both the second and the fourth resistances are about 10K ohm, and the third resistance is about 2K ohm.

15. The light control signal generating circuit as recited in claim 9, wherein when a signal strength of the ambient light is greater than or equal to a preset value, the photosensitive element is turned on, the base electrode of the first transistor is connected to the ground through the photosensitive element and regarded as a low level, the first transistor is turned off; the base electrode of the second transistor is connected to the power voltage terminal through the second resistance and regarded as a high level, the second transistor is turned on and outputs a low level voltage; and when the signal strength of the ambient light is less than the preset value, the photosensitive element is turned off, the base electrode of the first transistor is connected to the power voltage terminal through the first resistance and regarded as a high level, the first transistor is turned on and generates a small potential difference, the second transistor is turned off and the power voltage terminal outputs a high level voltage through the fourth resistance.

* * * * *